US006968548B1

(12) United States Patent  (10) Patent No.: US 6,968,548 B1
Tabbert  (45) Date of Patent: Nov. 22, 2005

(54) METHOD AND APPARATUS FOR SHARING DATA STRUCTURES BETWEEN ASSEMBLY LANGUAGE PROGRAMS AND HIGH-LEVEL LANGUAGE PROGRAMS

(75) Inventor: Allen B. Tabbert, Bloomington, MN (US)

(73) Assignee: Unisys Corporation, Blue Bell, PA (US)

(*) Notice: Subject to any disclaimer, the term of this patent is extended or adjusted under 35 U.S.C. 154(b) by 767 days.

(21) Appl. No.: 09/727,606

(22) Filed: Dec. 1, 2000

(51) Int. Cl.[7] .................................. G06F 9/44

(52) U.S. Cl. ..................... 717/162; 717/137

(58) Field of Search .............. 717/137, 162, 717/163, 164

(56) References Cited

U.S. PATENT DOCUMENTS

| 5,805,893 | A | * | 9/1998 | Sproul et al. ............. 717/137 |
| 5,832,273 | A | * | 11/1998 | Mizuse ..................... 717/154 |
| 6,061,519 | A | * | 5/2000 | Rathnam .................. 717/142 |
| 6,314,557 | B1 | * | 11/2001 | Shenderovich ............ 717/114 |

OTHER PUBLICATIONS

"Turbo Assembler® Version 3.0 User's Guide," 1991, Borland International, Inc., pp. i-x, 1-7, 83-101, 223-228, 241-278.*

* cited by examiner

*Primary Examiner*—Tuan Dam
*Assistant Examiner*—Eric B. Kiss
(74) *Attorney, Agent, or Firm*—Charles A. Johnson; Mark T. Starr; Crawford Maunu PLLC

(57) ABSTRACT

Data structure definitions set forth in one language may be shared between different programming languages. Data structures that include one or more elements are defined in both an assembly language source code file and in high-level language source code file, with the definitions in the assembly language source code file being in the high-level language. The storage requirements of the data structures are determined from the definitions set forth in the assembly source file and the definitions are removed from the assembly source file prior to processing by an assembler. Memory allocation directives that are included in the assembly source file specify memory addresses of the data structures and are removed from the assembly source program prior to processing by the assembler. The assembly source file includes references to elements of the data structures in the form of substitution directives. Using the memory allocation directives and the data structure definitions, the substitution directives are replaced with memory addresses or element sizes prior to processing by the assembler.

15 Claims, 3 Drawing Sheets

METHOD AND APPARATUS FOR SHARING DATA STRUCTURES BETWEEN ASSEMBLY LANGUAGE PROGRAMS AND HIGH-LEVEL LANGUAGE PROGRAMS

FIELD OF THE INVENTION

The present invention generally relates to sharing data between assembly language computer program code and high-level language code, and more particularly to a method for sharing data structures between assembly code and high-level code.

BACKGROUND OF THE INVENTION

Low-level system software, for example, a BIOS, has historically been written in assembly language. As systems have evolved and become more complex, additional functions have been developed using a high-level language, for example C. Since access to certain instructions and/or registers is generally unavailable in a high-level language, assembly language code is likely to remain in use.

It is common in applications that include assembly code and high-level code to reference the same data structure in both the assembly code and in the high-level code. To support the references in the different languages, however, requires special measures since high-level language references are unsupported in assembly language code.

One approach for dealing with references to data structures in applications having assembly and high-level code uses a utility to convert a file having a high-level language data structure into the target assembly language. This approach is limited by the capabilities of the target assembly language to define data structures. Thus, with some assemblers, only simple data structures may be shared between the assembly and high-level code.

Another approach uses a utility to translate high-level language data structures into assembly "equate" statements. This approach requires the generation of equate statements for all addressable elements of a data structure. Thus, for complex data structures, for example, nested structures and arrays of structures, generation of suitable equate statements is impractical.

A method and apparatus that addresses the aforementioned problems, as well as other related problems, are therefore desirable.

SUMMARY OF THE INVENTION

In various embodiments, the invention provides a method and apparatus for sharing one or more high-level language data structures between an assembly language program and a high-level language program. In one embodiment, data structures that include one or more elements are defined in both an assembly language source code file and in high-level language source code file, with the definitions in the assembly language source code file being in the high-level language. The storage requirements of the data structures are determined from the definitions set forth in the assembly source file and the definitions are removed from the assembly source file prior to processing by an assembler. Memory allocation directives that are included in the assembly source file specify memory addresses of the data structures and are removed from the assembly source program prior to processing by the assembler. The assembly source file includes references to elements of the data structures in the form of substitution directives. Using the memory allocation directives and the data structure definitions, the substitution directives are replaced with memory addresses or element sizes prior to processing by the assembler.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
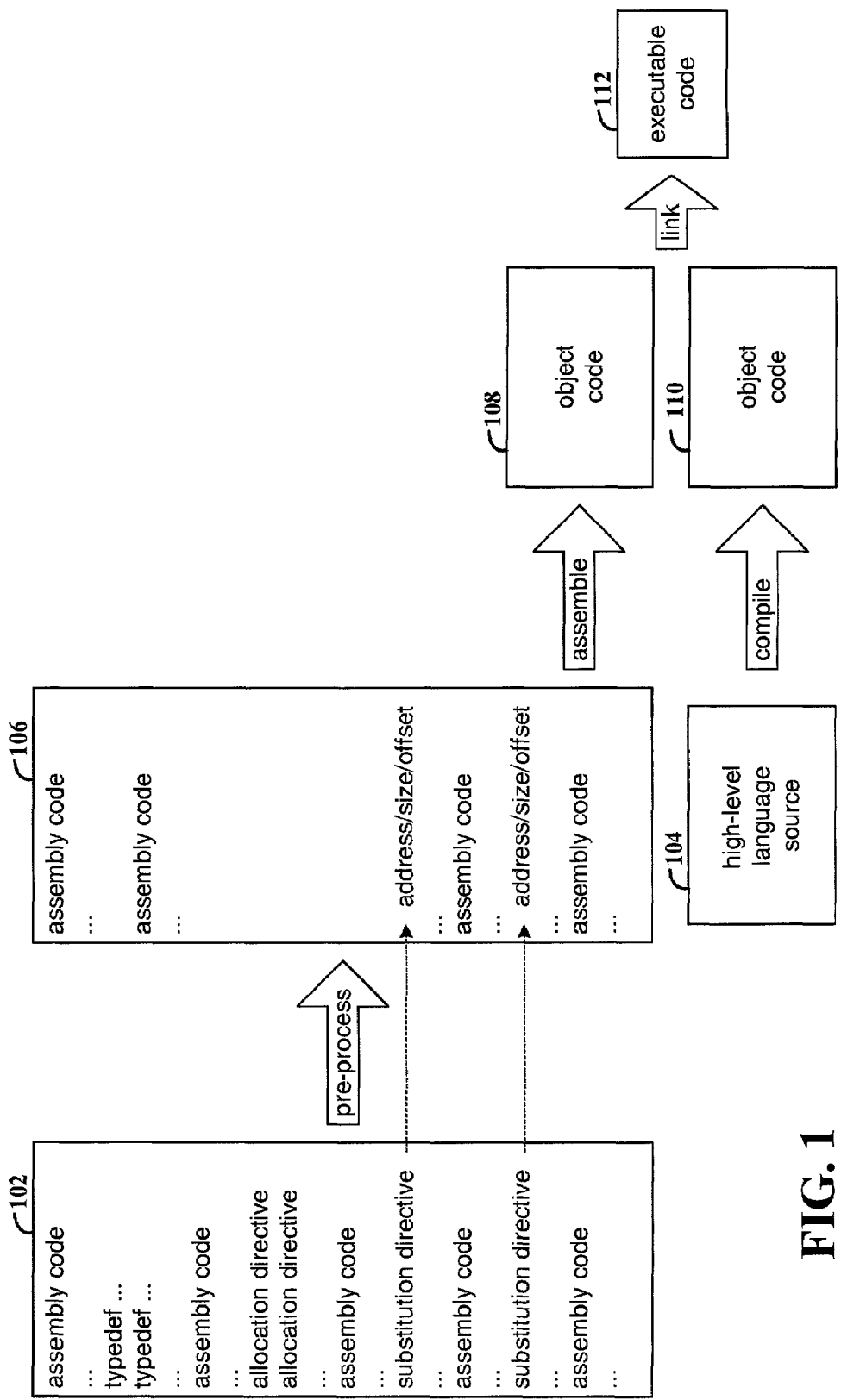
FIG. 1 is a data flow diagram illustrating the transformation of assembly code having high-level definitions of data structures and references thereto.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

In various embodiments, the invention supports references to data structures in both assembly language code and in high-level language code. The data structures to be referenced are defined in the high-level language in both the assembly code and in the high-level code. The assembly language code includes allocation directives and substitution directives for allocating memory and for resolving references to the data structures. The assembly code is processed prior to assembly ("pre-processed") to replace the substitution directives with addresses and/or sizes of the data structures based on the allocation directives and type definitions of the data structures. The pre-processing of the assembly code removes the data structure definitions and allocation directives from the source code. The resulting assembly code can then be assembled since it includes constructs recognized by the assembler. The high-level source code includes the same definitions of data structures and can be compiled normally. The object code from the assembler and compiler can then be linked into an executable segment of code.

FIG. 1 is a data flow diagram illustrating the transformation of assembly code having high-level definitions of data structures and references thereto. Block 102 represents a source code file of assembly code, and block 104 represents a high-level language source code file. Both assembly source file 102 and high-level source file 104 include definitions of one or more shared data structures. For example, in the C language, the reserved word "typedef" is used to begin the definition of a data type, which may be a language supported data structure (e.g., structures, arrays, nested structures, arrays of structures, etc.) or a hierarchy built with language supported data structures. Two typedefs are illustrated in the assembly source file 102. It will be appreciated that "include" files may also be used as recognized by those skilled in the art.

Example type definitions are set forth in the code below.

```
typedef struct {
    long        handle;
    unsigned short vars[8];
} s1Type;
typedef struct {
    char    id[4];
    s1Type s1Item[10];
} s2Type;
#define s2BASE 0x1800
```

The #define statement is used to equate the label s2BASE with the hexadecimal value 0x1800. This allows the label s2BASE to be used in the assembly code instead of the hexadecimal value.

In addition to the data structure definitions, the assembly source file 102 also includes allocation directives and substitution directives. Allocation directives are used to define the memory locations of the data structures. In one embodiment, an allocation directive has the following syntax:

alloc typename var <array> @ address where typename is the name specified in the typedef statement, var is the variable name, which may optionally be an array, and address is the absolute hexadecimal address at which the data structure is to be allocated. Example allocation directives for the example typedefs set forth above are set forth in the code below.

```
#alloc s1Type v1[3] @ 0x1700
#alloc s2Type v2[30] @ s2BASE
```

A substitution directive sets forth a hierarchical reference to an element within a data structure and includes a request for either the element's size or address. In one embodiment, a substitution directive has the following syntax:

(subs-directive reference)# where subs-directive is one of "addrof", "sizeof", or "offsetof". The addrof directive requests the absolute address of the referenced element, the sizeof directive requests the size of the referenced element, and the offsetof directive requests the offset of the referenced element relative to the base address of the structure. The "reference" sets forth a hierarchical reference to the desired element similar to a high-level language reference to the element. Example substitution directives are set forth in the code below:

```
mov   eax, #(addrof  v1[2].handle)# ;
mov   si,  #(offsetof v1[2].handle)# ;
mov   cx,  #(sizeof  v1[2].handle)# ;
mov   cx,  #(sizeof  v2[10].s1Item[0].vars[3])# ;
mov   ebx, #(addrof  v2[10].s1Item[2].vars[3])# ;
mov   edx, #(offsetof v2[10].s1Item[2].vars[3])# ;
```

In pre-processing the assembly language source file 102, the substitution directives are replaced with the addresses and sizes as specified. For example, the assembly language source code file 106 would not have the type definitions, allocation directives, and substitution directives from the original assembly source file 102. The substitution directives would be replaced with the appropriate addresses and sizes. Example assembly code resulting from the replacement of the substitution directives in the example code above is set forth in the code below.

```
mov   eax, 1728h        ;
mov   si,  28h          ;
mov   cx,  4h           ;
mov   cx,  2h           ;
mov   ebx, 202Eh        ;
mov   edx, 82Eh         ;
```

Once the assembly source file 102 has been pre-processed into assembly source file 106, source 106 is assembled into object code 108. The high-level language source file 104 is compiled into object code 110. The example code below illustrates code included in high-level source file 104 for referencing the data structures described above.

```
s1Type *s1Ptr = (s1Type *)0x1700;
s2Type *s2Ptr = (s2Type *)s2BASE;
...
(s1Ptr+2)->handle = 0x1111;
(s2Ptr+10)->s1Item[2].vars[3] = 3;
size = sizeof(s2Ptr->s1Item[0].vars[3]);
offset = (int)(&((s2Ptr+10)->s1Item[2].vars[3])) - (int)s2Ptr;
```

Object code 108 and 110 are then linked to form executable code 112.

Figure 2:
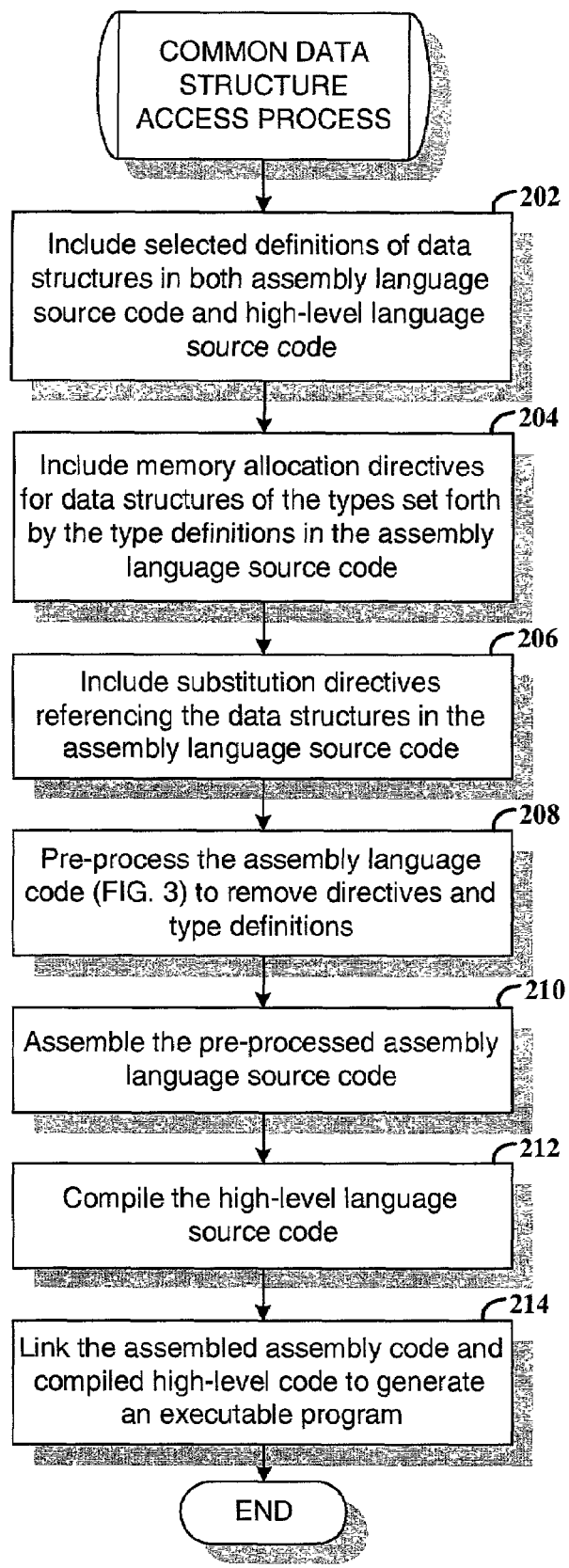
FIG. 2 is a flowchart of a process for providing data structure access to both assembly language code and to code written in a high-level language.

FIG. 2 is a flowchart of a process for providing data structure access to both assembly language code and to code written in a high-level language. At step 202, definitions of the data structure are specified in both the assembly language code and in the high-level language code. In one embodiment, the data structure definitions in the assembly language code conform to the syntax of the high-level language. At step 204, the assembly language code is programmed to include allocation directives for the data structures. The allocation directives specify the absolute addresses of the data structures.

To reference elements of the data structures in the assembly code, substitution directives are specified in combination with the assembly code, as shown by step 206. It will be appreciated that the high-level source code can be conventionally programmed to reference the elements of the data structures.

At step 208, the assembly language source code is pre-processed to remove the data structure definitions and allocation directives, and replace the substitution directives with the appropriate sizes and addresses. After pre-processing, the assembly language code is processed by a conventional assembler at step 210. At step 212, the high-level language code is compiled, and at step 214 the object code from the assembler and compiler are linked into an executable program. The executable program can then be run on a suitable computer.

Figure 3:
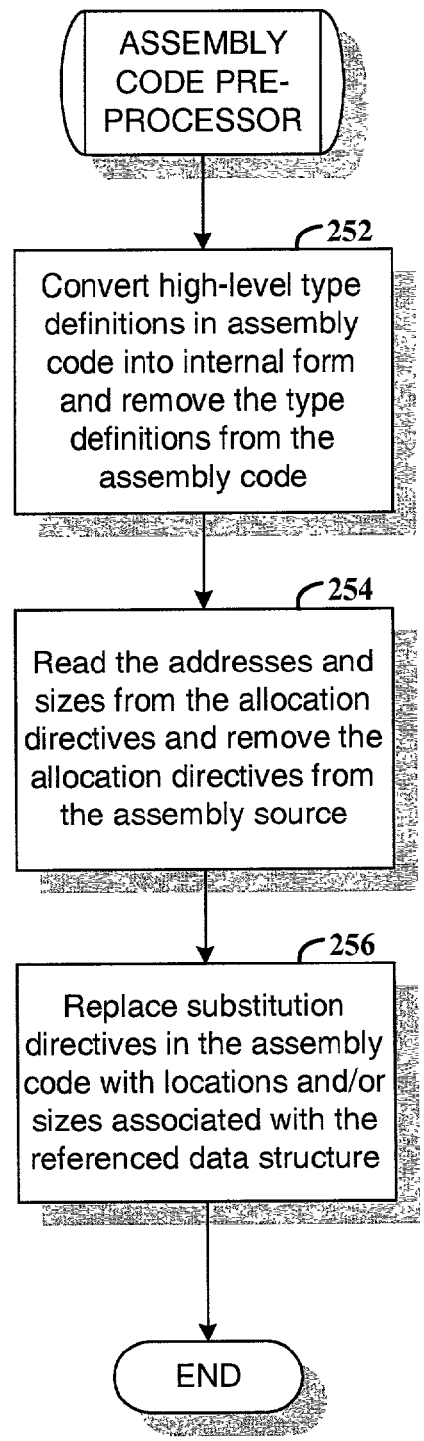
FIG. 3 is a flowchart of the pre-processing performed on an assembly language source file in accordance with one embodiment of the present invention.

FIG. 3 is a flowchart of the pre-processing performed on an assembly language source file in accordance with one embodiment of the present invention. At step 252, the high-level type definitions are parsed to determine the storage requirements of the elements of the data structures. For example, the size of a structure can be determined from the constituent elements, for example, character strings, integers, floating point numbers, arrays, etc. The definitions are also removed from the assembly source code.

At step 254, the data structure addresses and sizes are read from the allocation directives in the assembly source code. The addresses are the absolute addresses of the data structures and the sizes are array sizes, for example. The addresses and storage requirements determined at steps 252 and 254 are then used in processing the substitution directives.

At step 256, the substitution directives are replaced with either a size or an address, depending on the specified directive (i.e., addrof, offsetof, or sizeof). Using the data structure size information obtained from the definitions and the address information from the allocation directives, the appropriate addresses can be computed. Once the substitution directives have been replaced, pre-processing of the assembly source file is complete.

Accordingly, the present invention provides, among other aspects, a method and apparatus for sharing data structures between assembly language source code and high-level language source code. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for sharing one or more high-level language data structures between an assembly language program and a high-level language program, each data structure including one or more elements, comprising the steps of:
   determining storage requirements from high-level language definitions of the one or more data structures in an assembly language source program and removing the definitions from the assembly source program;
   determining memory addresses of the one or more data structures from memory allocation directives in the assembly language source program and removing the allocation directives from the assembly source program; and
   replacing references to elements of the data structures in the assembly source program with memory addresses.

2. The method of claim 1, further comprising:
   assembling the assembly source program into a first object code segment;
   compiling the high-level language program into a second object code segment; and
   linking the first and second object code segments.

3. The method of claim 1, wherein each allocation directive includes a reference to a data structure definition, a variable name, and an address.

4. The method of claim 3, wherein variable name includes an array size.

5. The method of claim 1, wherein a reference to an element of a data structure in the assembly source program includes a hierarchical specification of the element.

6. The method of claim 5, wherein a reference to an element of a data structure in the assembly source program includes one of a request for an address and a request for an offset address of the element.

7. The method of claim 5, wherein a reference to an element of a data structure in the assembly source program includes one of a request for an address of the element, a request for an offset address of the element, and a request for a size of the element.

8. The method of claim 7, further comprising replacing a reference to an element of a data structure that includes a request for a size of an element with the size of the element.

9. The method of claim 8, further comprising:
   assembling the assembly source program into a first object code segment;
   compiling the high-level language program into a second object code segment; and
   linking the first and second object code segments.

10. The method of claim 8, wherein each allocation directive includes a reference to a data structure definition, a variable name, and an address.

11. The method of claim 10, wherein variable name includes an array size.

12. The method of claim 5, further comprising:
   assembling the assembly source program into a first object code segment;
   compiling the high-level language program into a second object code segment; and
   linking the first and second object code segments.

13. The method of claim 5, wherein each allocation directive includes a reference to a data structure definition, a variable name, and an address.

14. An apparatus for sharing one or more high-level language data structures between an assembly language program and a high-level language program, each data structure including one or more elements, comprising:
   means for determining storage requirements from high-level language definitions of the one or more data structures in an assembly language source program and removing the definitions from the assembly source program;
   means for determining memory addresses of the one or more data structures from memory allocation directives in the assembly language source program and removing the allocation directives from the assembly source program; and
   means for replacing references to elements of the data structures in the assembly source program with memory addresses.

15. The method of claim 13, wherein variable name includes an array size.

* * * * *